July 6, 1954     H. J. GRAHAM     2,683,040
FLUID OPERATED CHUCK
Filed Sept. 7, 1949     2 Sheets-Sheet 2
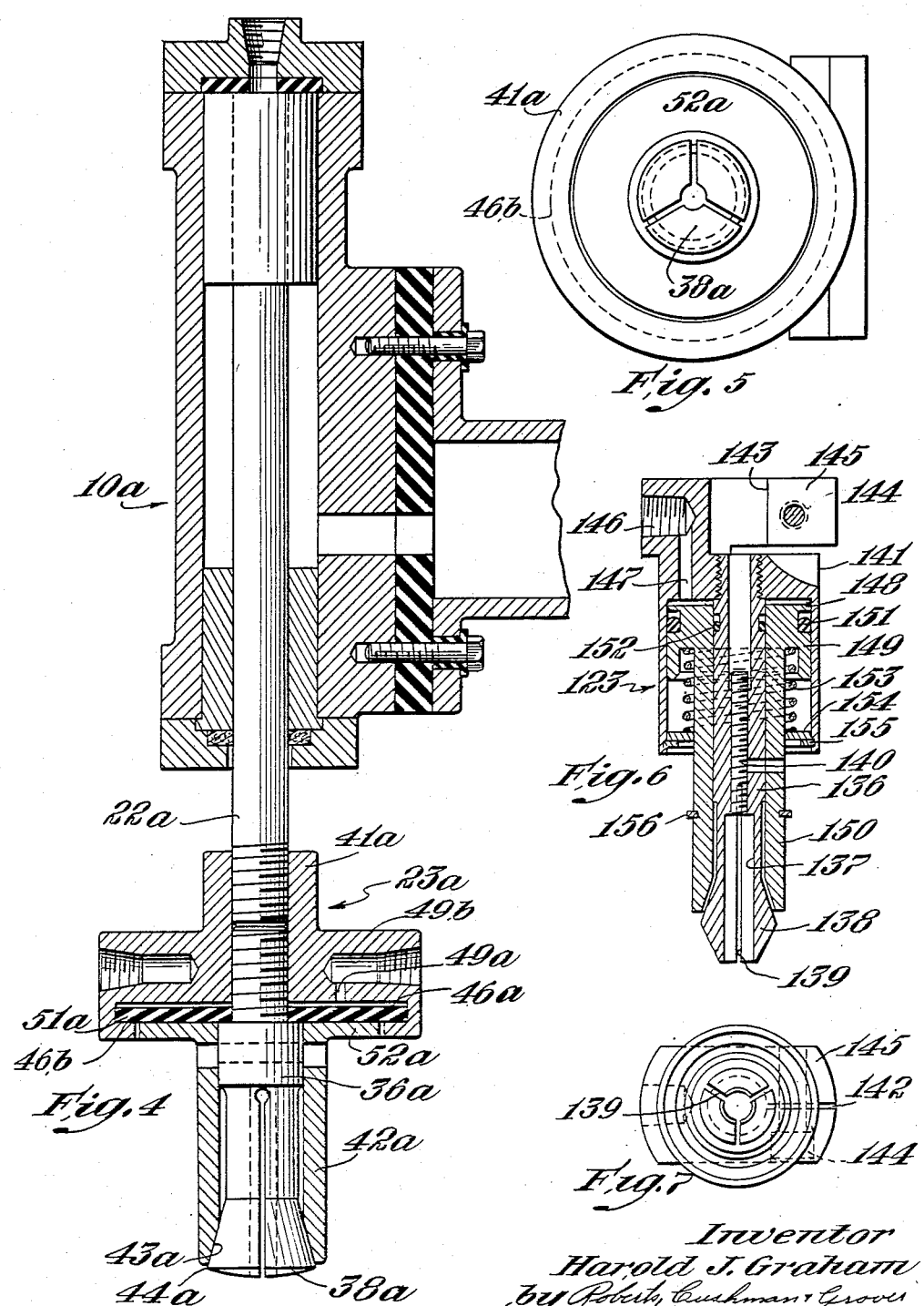
Inventor
Harold J. Graham
by Roberts, Cushman & Groves
att'ys.

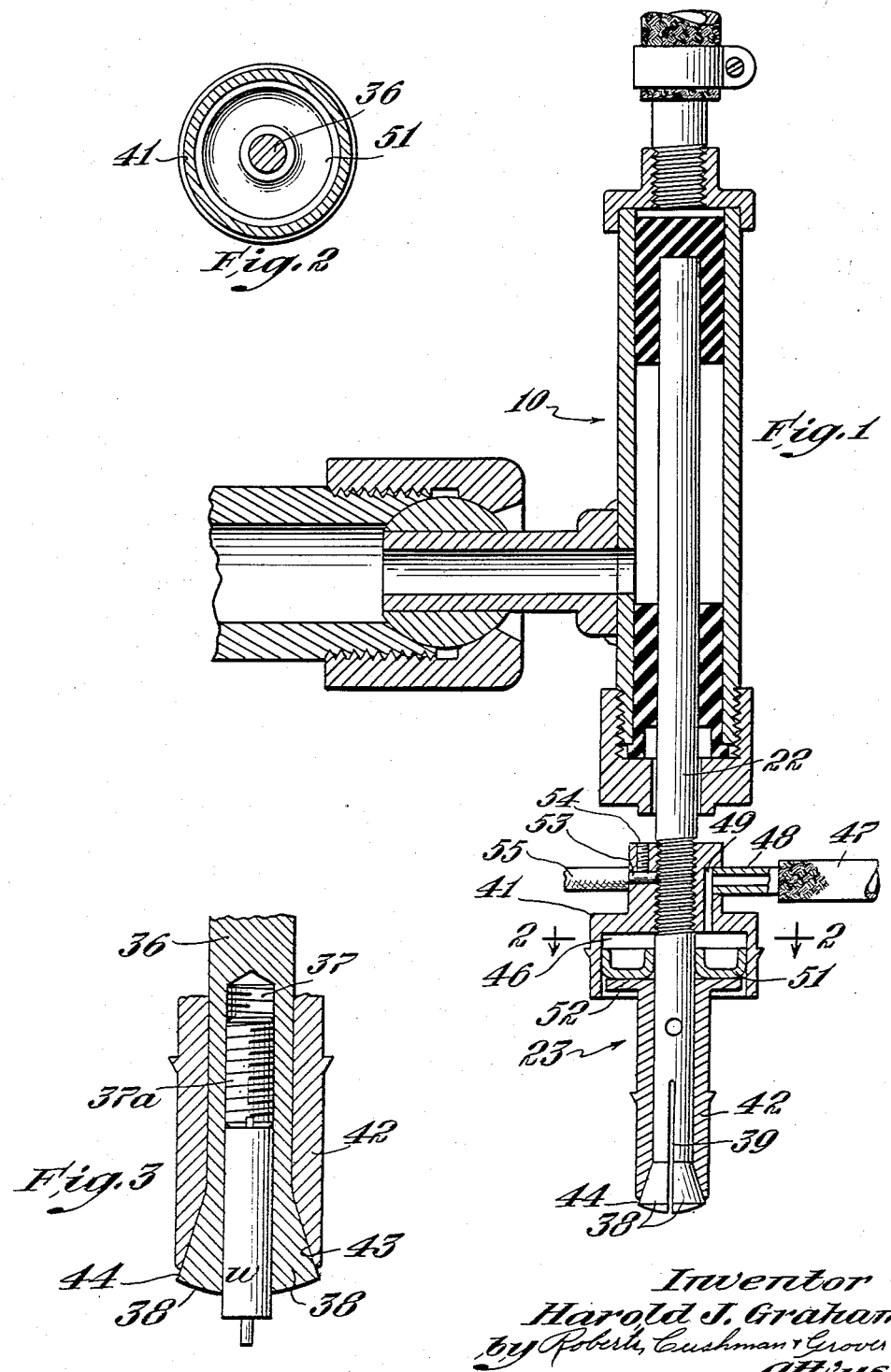

Patented July 6, 1954

2,683,040

UNITED STATES PATENT OFFICE 2,683,040

FLUID OPERATED CHUCK

Harold J. Graham, Highland Park, Mich., assignor to Graham Manufacturing Corporation, Detroit, Mich., a corporation of Michigan Application September 7, 1949, Serial No. 114,315

4 Claims. (Cl. 279—4)

This invention relates to chucks and more particularly to chucks of the type for use with welding equipment such as that shown in my copending application Serial No. 81,130, filed March 12, 1949, now Patent No. 2,610,278, dated September 9, 1952, of which this present application is a continuation in part.

In a broad aspect the invention contemplates a fluid operated chuck comprising a body having a plurality of jaws located at one end thereof. The inner surfaces of the jaws define a centrically disposed recess for holding a workpiece, for example a welding stud of the type shown in my Patent No. 2,518,463, of August 15, 1950. The outer surfaces of the jaws are tapered to correspond with the inner tapered surface of a collet positioned circumjacent the body. Located in a head fastened to the opposite end of the body are fluid operated means for axially moving the collet with respect to the body so that the diameter of the recess defined by the jaws may be reduced thus securing the workpiece. Upon the removal of the fluid pressure, the collet may be returned to its normal position by means of the inherent elasticity of the jaws aided, if desired, by auxiliary elastic means such as a spring.

In another aspect the fluid operating means includes an operating member, for example a piston or flange, which is fastened to one end of the collet opposite the inner tapered collet surface coresponding to the jaw surfaces. The piston or flange is disposed within a recess in the head with means for introducing air or other operating fluid such as oil between the piston or flange and the bottom of the head recess whereby the collet is moved axially with respect to the body to close the jaws. To reduce the loss of operating fluid sealing means such as a diaphragm is used to prevent leakage past the operating member.

In one specific aspect the sealing means is an annular cup of yieldable material, for example natural or synthetic rubber, having a bottom portion abutting the inner side of the flange with its inner lip bearing against the body and its outer lip bearing against the wall of the circular recess in the head so that as fluid is introduced into the head recess through a passageway in the head the cup deforms moving the collet and concomitantly sealing the clearance spaces between the flange and the recess.

In another specific aspect sealing is provided by a disc or washer of yieldable material disposed between the flange or piston and the bottom of the head recess with the surface defining the centric aperture of the washer bearing against the body and the outer periphery thereof bearing against the wall of the recess. A passageway is provided in the head so that air may be introduced into the recess to deform the washer thus moving the collet with respect to the body.

A feature of another embodiment of the invention is the provision in the head of means such as a threaded aperture, a lug, a terminal, or other conventional connector, for connecting the conductor from a welding power supply thereby to couple one side of the supply to the stud or other workpiece held by the chuck.

These and other objects, aspects and features will be apparent from the following description of three illustrative specific embodiments of the invention referring to drawings in which:

Fig. 1 is a sectional view of one embodiment of the chuck attached to a welding gun;

Fig. 2 is a sectional view on line 2—2 of Fig. 1;

Fig. 3 is an enlarged sectional view of the embodiment of the chuck shown in Fig. 1;

Fig. 4 is a sectional view of a second embodiment of the chuck;

Fig. 5 is a bottom view of the embodiment of the chuck drawn in Fig. 4;

Fig. 6 is a sectional view of a third embodiment of the chuck; and

Fig. 7 is a bottom view of the embodiment of the chuck shown in Fig. 6.

In one particular embodiment of the invention chosen for the purpose of illustration a pneumatically operated chuck 23 is shown in Fig. 1 attached to a piston rod 22 of a welding gun 10 which is similar in construction and operation to the gun 10 described in detail in my copending application Serial No. 81,130.

The chuck 23 comprises a cylindrical body 36 having a centrically disposed recess 37 (Fig. 3) in one end thereof defined by the inner surfaces of the three jaws 38 which are formed by three equally spaced axial slots 39 in the lower end of the body 36. The other end of the recess 37 is threaded to engage the threads upon a stop 37a against the bottom of which abuts the stud w. The upper end of the body 36 is threaded to engage threads in the lower portion of an aperture in a head 41. The threaded aperture extends through the head 41, the upper portion thereof engaging the threads upon the end of the piston rod 22.

A collet 42 is positioned circumjacent the cylindrical body 36. The lower end of the collet 42 has a tapered inner surface 43 corresponding to the taper on the outer surface 44 of respective chuck jaws 38 so that the jaws are compressed to reduce the diameter of the aperture 37 as the collet is axially moved relative to the body 36.

Such relative movement is produced pneumatically by introducing compressed air into a cylindrical recess 46 in the lower portion of the head 41. The air is supplied through a flexible hose 47 and a nipple 48 which is welded or otherwise fastened to the upper portion of the head 41 so that the aperture in the nipple connects with a passageway 49 extending through the head to communicate with the recess 46. Located in the recess 46 is a diaphragm such as the annular cup 51 which is of yieldable material for example rubber or leather. The cup 51 is of such proportions that the inner lip thereof is in contact with the body 36 and its outer lip contacts the wall of the recess 46. The bottom of the cup 51 rests upon a circular flange 52 projecting normally from the upper portion of the collet 42 so that as air is introduced into the recess 46, as described above, the cup 51 bears against the flange 52 thereby moving the collet 42 to compress the jaws 38. The air pressure also forces the inner and outer lips of the cup 51 against the body 36 and the recess wall respectively, thereby preventing the loss of air. The compression of the jaws 38 reduce the diameter of the aperture 37 to secure the welding stud $w$ in the chuck, as shown in Fig. 3. When the air pressure is removed, the elasticity of the chuck jaws 38 forces the collet to move back so that the recess 37 returns to its original diameter.

Although the chuck 23 has been described for use with a welding gun, it is evident that a chuck of similar design and operation can also be used to hold small pieces in a lathe or other machine tool. When the chuck is used to hold a welding stud, the welding current is introduced by securing one lead 55 from a terminal of an electrical welding power source in a recess 53 in the side of the member 41 by means of a set screw 54.

In Fig. 4 a second embodiment of the chuck designated 23a is shown with a threaded aperture in its head 41a engaging the thread end of a piston rod 22a of a welding gun 10a. The lower portion of the threaded aperture engages the threaded end of a body 36a having three jaws 38a which are generally similar in construction to the jaws 38 described above. Surrounding the body 36a is a collet 42a having a tapered inner surface 43a at one end thereof for engaging with the corresponding outer surfaces 44a of the chuck jaws 38a.

The opposite end of the collet 42a has a normally projecting flange 52a of such diameter as to fit freely in a circular recess 46a in the bottom of the head 41a. The bottom portion of the recess 46a is bored as at 46b to a greater diameter than the remainder thereof to accommodate a flexible washer or diaphragm 51a having a centrically located aperture which engages the collet body 36a. Air is prevented from escaping by the deformation of the diaphragm 51a against the adjacent portion of the flange 52a.

The chuck 23a is operated by introducing air behind the washer 51a through the passageways 49a and 49b in the head 41a. The resulting force is transferred by the washer 51a to the flange 52a causing relative motion between the body 36a and the collet 42a thereby to contract the jaws 38a in a manner analogous to that described above in detail in connection with the operation of the chuck 23.

A third embodiment of the chuck 123 is shown in Fig. 6. The chuck 123 comprises a cylindrical body 136 having a centrically disposed recess 137 in its lower end which is defined by the inner surfaces of the three jaws 138 formed by three equally spaced axial slots 139 in the lower body end. Beyond the jaws 138 the recess 137 is reduced in diameter and is provided with an internal thread for engaging the threads upon a set screw 140 which projects into the recess 137. By varying the thread engagement of the screw 140 a stop for the end of the stud is provided whereby the chuck 123 can be adjusted to accommodate studs of varying lengths.

The upper end of the body 136 is threaded into a head 141 having a flange 145 slotted as at 142 (Fig. 7) so that the diameter of a centric aperture 143 is reduced by the tightening of a screw 144 thereby to grip the end of a piston rod of a welding gun or other operating arm (not shown).

The opposed portion of the flange 145 is provided with a radially disposed aperture 146 having internal pipe threads for connecting with a conduit from a compressed air supply (not shown). A passageway 147 extends between the threaded aperture 146 and a circular recess 148 wherein is reciprocatingly disposed a skirted piston 149 which is integrally connected with the upper end of a collet 150 which is positioned circumjacent the body 136. The lower end of the collet 150 has a tapered inner surface corresponding to the taper upon the outer surfaces of the respective chuck jaws 138 so that the jaws are compressed to reduce the diameter of the aperture 137 when the collet is axially moved relatively to the body 136 by the introduction of air or other operating fluid through the aperture 146 and passageway 147.

Leakage of the air by the piston is prevented by the O rings 151 and 152 of yieldable material such as synthetic rubber. The larger ring 151 is carried in a shallow circumferential groove cut in the outer periphery of the piston 149 so that the ring slidingly bears against the wall of the recess 148 thereby preventing air leakage between the recess wall and the piston. The smaller ring 152 is carried in a groove in the body 136 so that it bears against the inner surface of the piston 149.

When the air supply is disconnected, the piston 149 is forced upwardly to its normal position by means of a spring 153 one end of which seats in the circular recess formed between the collet 150 and the skirted portion of the piston 149. The other end of the spring 153 bears against the top of a washer 154 which is held in the head recess 148 by means of a snap retaining ring 155 which engages a groove cut in the wall of the recess. Another snap ring 156 engages a groove cut in the outer surface of the collet 150 which is used for holding a rubber boot (not shown) to prevent the spattering of the weld and to retain the inert gases within the welding zone.

It should be understood that the present disclosure is for the purpose of illustration only and that this invention includes all modifications and equivalents which fall within the scope of the appended claims.

I claim:

1. A fluid operated chuck for securing a workpiece comprising a body having a plurality of jaws on one end thereof whose inner surfaces define a centrically disposed recess for receiving the workpiece, the outer surfaces of said jaws being tapered, a head having a cylindrical recess to the bottom whereof is secured the other end of the body so that the jaws extend beyond the head, a collet slidably arranged circumjacent said body and having a tapered inner surface for conjointly engaging the tapered outer surfaces of the jaws, and means for sliding the collet relative to said body for compressing said jaws to secure the workpiece, said means including a flange extending radially from the opposite end of said collet than said tapered inner surface so that the flange is freely disposed in the head recess without coming into contact with the wall thereof, a passageway for introducing fluid into said head recess so as to exert a force upon said flange to move said collet with respect to said body, and a flexible diaphragm interposed between said flange and the bottom of said head recess, the outer diameter of the diaphragm being greater than the diameter of the recess so that the diaphragm acts as a seal for preventing the escape of fluid past said flange.

2. A chuck according to claim 1 wherein the outer jaw surfaces taper outwardly towards the end thereof to permit the elasticity of the jaws to force the collet upwardly and to open the jaws when the fluid pressure is released from the head recess.

3. A chuck according to claim 1 wherein the diaphragm is in the form of a flat washer whose inner diameter bears against the body and whose outer diameter bears against the wall of the head recess to complete the seal.

4. A chuck according to claim 1 wherein the diaphragm is in the form of a cup having inner and outer upturned lips, the inner lip bearing against the body and the outer lip bearing against the wall of the head to complete the seal.

References Cited in the file of this patent

UNITED STATES PATENTS

| Number | Name | Date |
|---|---|---|
| 728,572 | Hanson | May 19, 1903 |
| 1,085,146 | McClellan | Jan. 27, 1914 |
| 2,065,018 | Oliver et al. | Dec. 22, 1936 |
| 2,191,494 | Nelson | Feb. 27, 1940 |
| 2,208,865 | Gette | July 23, 1940 |
| 2,418,082 | Marasko | Mar. 25, 1947 |
| 2,428,496 | Mead | Oct. 7, 1947 |
| 2,439,830 | Varela | Apr. 20, 1948 |
| 2,479,092 | Ainsworth | Aug. 16, 1949 |
| 2,518,463 | Graham | Aug. 15, 1950 |
| 2,589,291 | Sanford | Mar. 18, 1952 |
| 2,610,278 | Graham | Sept. 9, 1952 |